(12) United States Patent
Hou et al.

(10) Patent No.: US 12,494,226 B1
(45) Date of Patent: Dec. 9, 2025

(54) INFORMATION VERIFICATION METHOD AND RELATED DEVICE

(71) Applicants: HUAWEI TECHNOLOGIES CO., LTD., Shenzhen (CN); Tsinghua Shenzhen International Graduate School, Shenzhen (CN)

(72) Inventors: Bowen Hou, Shenzhen (CN); Mingyuan Liu, Shenzhen (CN); Mali Gong, Shenzhen (CN); Jianshe Ma, Shenzhen (CN); Yuhao Zou, Shenzhen (CN)

(73) Assignees: Huawei Technologies Co., Ltd., Shenzhen (CN); Tsinghua Shenzhen International Graduate School, Shenzhen (CN)

( * ) Notice: Subject to any disclaimer, the term of this patent is extended or adjusted under 35 U.S.C. 154(b) by 0 days.

(21) Appl. No.: 19/003,937

(22) Filed: Dec. 27, 2024

Related U.S. Application Data

(63) Continuation of application No. PCT/CN2023/101533, filed on Jun. 20, 2023.

(30) Foreign Application Priority Data

Jun. 28, 2022 (CN) .......................... 202210742343.X (51) Int. Cl.
*G11B 7/0045* (2006.01)
*G11B 7/24097* (2013.01)
(Continued)

(52) U.S. Cl.
CPC ...... *G11B 7/00458* (2013.01); *G11B 7/24097* (2013.01); *G11B 7/128* (2013.01); *G11B 7/1365* (2013.01)

(58) Field of Classification Search
None
See application file for complete search history.

(56) References Cited

U.S. PATENT DOCUMENTS

| | | | |
|---|---|---|---|
| 4,322,758 A | * | 3/1982 | Ohya ................. G01R 13/402 345/47 |
| 6,071,671 A | | 6/2000 | Glushko et al. |

(Continued)

FOREIGN PATENT DOCUMENTS

| CN | 101893464 A | 11/2010 |
|---|---|---|
| CN | 205982089 U | 2/2017 |

*Primary Examiner* — Peter Vincent Agustin
(74) *Attorney, Agent, or Firm* — Leydig, Voit & Mayer, Ltd.

(57) ABSTRACT

An information verification method and related device are provided. In the method, a fluorescent signal may be obtained, where the fluorescent signal is an electrical signal generated based on a plurality of fluorescent spots, and the fluorescent signal includes a plurality of pulse signals; an information symbol corresponding to each pulse signal may be determined based on a preset amplitude threshold and an amplitude of each pulse signal; an information sequence may be obtained based on the information symbol corresponding to each pulse signal; and a verification result of the information sequence may be obtained based on a first quantity of pulse signals between any two pulse signals in the plurality of pulse signals and a time interval between the any two pulse signals. According to the application, resulting in an error in information content corresponding to the read signal can be resolved.

18 Claims, 6 Drawing Sheets

(51) Int. Cl.
*G11B 7/128* (2012.01)
*G11B 7/1365* (2012.01)

(56) References Cited

U.S. PATENT DOCUMENTS

| | | | |
|---|---|---|---|
| 7,486,790 B1 | 2/2009 | Selinfreund et al. | |
| 11,335,373 B1* | 5/2022 | Subramanian | G11B 7/24067 |
| 2003/0235136 A1* | 12/2003 | Akselrod | B82Y 10/00 |
| | | | 369/108 |
| 2005/0078591 A1* | 4/2005 | Akselrod | G11B 7/00552 |
| | | | 430/269 |
| 2006/0099376 A1 | 5/2006 | Magnitskii et al. | |
| 2007/0110945 A1* | 5/2007 | Saalmink | G11B 7/24079 |
| 2008/0125317 A1* | 5/2008 | Alpert | G11B 7/256 |
| 2010/0271928 A1* | 10/2010 | Yamazoe | G11B 7/127 |
| 2013/0142021 A1* | 6/2013 | Canioni | G11B 7/24088 |
| | | | 369/103 |
| 2015/0048256 A1* | 2/2015 | Matsumura | G11B 7/09 |
| | | | 250/453.11 |

\* cited by examiner

| Voltage applied to an electro-optic crystal | $-V_x$ | $-\frac{3}{4}V_x$ | $-\frac{1}{2}V_x$ | $-\frac{1}{4}V_x$ | 0 | $\frac{1}{4}V_x$ | $\frac{1}{2}V_x$ | $\frac{3}{4}V_x$ | $V_x$ |
|---|---|---|---|---|---|---|---|---|---|
| Polarization direction before a quarter wave plate | ↕ | ↕ | ↕ | ↕ | ↕ | ↕ | ↕ | ↕ | ↕ |
| Polarization direction after the quarter wave plate | ○ | ○ | ○ | ○ | ○ | ○ | ○ | ○ | ○ |
| Polarization direction after the electro-optic crystal | ↕ | ↕ | ↕ | ↕ | ↕ | ↕ | ↕ | ↕ | ↕ |
| Polarization direction after a polarizer | ○ | ○ | ○ | ○ | ○ | ○ | ○ | ○ | ○ |

INFORMATION VERIFICATION METHOD AND RELATED DEVICE

CROSS-REFERENCE TO RELATED APPLICATIONS

This application is a continuation of International Application No. PCT/CN2023/101533, filed on Jun. 20, 2023, which claims priority to Chinese Patent Application No. 202210742343.X, filed on Jun. 28, 2022. The disclosures of the aforementioned applications are hereby incorporated by reference in their entireties.

TECHNICAL FIELD

Embodiments of this application relate to the field of fluorescent information processing technologies, and in particular, to an information verification method and a related device.

BACKGROUND

In the field of technologies such as an optical disc, because there may be a long information mark, a long read signal is often detected, and information content corresponding to the read signal needs to be determined based on clock timing information.

However, such an information reading manner requires extremely high time sequence stability. If time sequence instability or jitter exists, the read signal is prone to be deviated, resulting in an error in the information content corresponding to the read signal.

SUMMARY

Embodiments of this application provide an information verification method, to resolve a current problem in the field of technologies such as an optical disc that a conventional information reading manner easily causes a deviation in a read signal due to time sequence instability or jitter, resulting in an error in information content corresponding to the read signal. This application further provides a corresponding apparatus, device, computer-readable storage medium, computer program product, and the alike.

A first aspect of this application provides an information verification method, and the method includes: obtaining a fluorescent signal, where the fluorescent signal is an electrical signal generated based on a plurality of fluorescent spots, and the fluorescent signal includes a plurality of pulse signals; determining, based on a preset amplitude threshold and an amplitude of each pulse signal, an information symbol corresponding to each pulse signal; obtaining an information sequence based on the information symbol corresponding to each pulse signal; and obtaining a verification result of the information sequence based on a first quantity of pulse signals between any two pulse signals in the plurality of pulse signals and a time interval between the any two pulse signals.

In the first aspect, the information sequence corresponding to the plurality of fluorescent spots may be obtained based on amplitudes of the plurality of pulse signals included in the fluorescent signal and the preset amplitude threshold, and then mutual verification may be performed based on a quantity of pulse signals in the fluorescent signal and a time interval between pulse signals, to efficiently verify whether there is a bit error such as pulse missing detection. In this way, whether the read information sequence is accurate can be efficiently verified in a scenario such as fluorescent optical storage, and whether a surface defect is detected can be further verified in a scenario such as surface defect detection.

In addition, because each pulse signal corresponds to an information symbol, different from current conventional optical disc storage, there is no need to strictly ensure synchronization of a clock signal during data reading and writing, to reduce a high bit error rate caused by data jitter.

In a possible implementation of the first aspect, the obtaining a verification result of the information sequence based on a first quantity of pulse signals between any two pulse signals in the plurality of pulse signals and a time interval between the any two pulse signals includes: verifying whether the first quantity matches a second quantity, where the second quantity is determined based on a preset period threshold and the time interval between the any two pulse signals; and obtaining the verification result of the information sequence based on a result of the matching between the first quantity and the second quantity, where the verification result indicates whether a quantity of bits of the information sequence is correct.

In a possible implementation of the first aspect, the method is applied to a control device in a fluorescent optical storage system. The fluorescent optical storage system further includes an optical disc, and the optical disc includes the plurality of fluorescent spots arranged according to a specified rule. The fluorescent signal is generated based on the plurality of fluorescent spots on the optical disc.

In a possible implementation of the first aspect, the obtaining a fluorescent signal includes: controlling a laser to move in a preset moving manner, and controlling the laser to emit first laser light to the optical disc in a moving process, so that when the first laser light is irradiated to a corresponding fluorescent spot on the optical disc, the fluorescent spot emits fluorescent light; and obtaining, via a photoelectric detector, the fluorescent signal based on the fluorescent light emitted by the fluorescent spot.

In a possible implementation of the first aspect, the fluorescent spot is generated based on second laser light. An optical path corresponding to the second laser light passes through an electro-optic crystal. A state of each fluorescent spot is related to a magnitude of a voltage applied by an electro-optic modulator to the electro-optic crystal.

In a possible implementation of the first aspect, on the optical path corresponding to the second laser light, a quarter wave plate is further disposed before the electro-optic modulator, so that the second laser light is converted from a form of linearly polarized light to a form of circularly polarized light or elliptically polarized light by using the quarter wave plate, and is incident to the electro-optic crystal in the form of circularly polarized light or elliptically polarized light.

A second aspect of this application provides an information verification apparatus. The apparatus has a function of implementing the method according to any one of the first aspect or the possible implementations of the first aspect. The function may be implemented by hardware, or may be implemented by hardware executing corresponding software. The hardware or the software includes one or more modules corresponding to the foregoing functions, for example, an obtaining module, a determining module, a processing module, and a verification module.

A third aspect of this application provides a control device. The control device includes at least one processor, a memory, and computer-executable instructions stored in the memory and executable on the processor. When the computer-executable instructions are executed by the processor, the processor performs the method according to any one of the first aspect or the possible implementations of the first aspect.

A fourth aspect of this application provides a computer-readable storage medium storing one or more computer-executable instructions. When the computer-executable instructions are executed by a processor, the processor performs the method according to any one of the first aspect or the possible implementations of the first aspect.

A fifth aspect of this application provides a computer program product storing one or more computer-executable instructions. When the computer-executable instructions are executed by a processor, the processor performs the method according to any one of the first aspect or the possible implementations of the first aspect.

A sixth aspect of this application provides a chip system. The chip system includes a processor, configured to support a control device in implementing the functions in any one of the first aspect or the possible implementations of the first aspect. In a possible design, the chip system may further include a memory. The memory is configured to store program instructions and data necessary for a computer device. The chip system may include a chip, or may include a chip and another discrete component.

For technical effects brought by any one of the second aspect to the sixth aspect or the possible implementations of the second aspect to the sixth aspect, refer to the technical effects brought by the first aspect or the related possible implementations of the first aspect. Details are not described herein again.

DESCRIPTION OF EMBODIMENTS

The following describes embodiments of this application with reference to the accompanying drawings in embodiments of this application. Terms used in implementations of this application are merely used to explain specific embodiments of this application, but are not intended to limit this application.

A person of ordinary skill in the art may know that with evolution of technologies and emergence of a new scenario, technical solutions according to embodiments of this application are also applicable to similar technical problems.

In this application, "at least one" means one or more, and "a plurality of" means two or more. "And/or" describes an association relationship between associated objects and indicates that three relationships may exist. For example, A and/or B may indicate the following three cases: Only A exists, both A and B exist, and only B exists, where A and B may be singular or plural. The character "/" generally indicates an "or" relationship between the associated objects. "At least one of the following" or a similar expression thereof means any combination of these items, including any combination of a single item or a plurality of items. In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain", and any other variants mean to cover the non-exclusive inclusion, so that a process, method, system, product, or device that includes a series of units is not necessarily limited to those units, but may include other units not expressly listed or inherent to such a process, method, system, product, or device.

An information verification method in embodiments of this application relates to a plurality of discretely arranged fluorescent spots, and is specifically used to verify information related to the plurality of discretely arranged fluorescent spots. In different application scenarios, specific functions of the fluorescent spots may be different.

The following uses examples to describe some application scenarios in embodiments of this application.

1. In an example, embodiments of this application are applied to the field of optical storage.

An optical storage technology is a technology that uses laser light to irradiate a medium, and enables a physical and chemical change of the medium through interaction between the laser and the medium, to store information. An optical disc is a memory developed based on the optical storage technology. There may be a plurality of types of optical discs. For example, the optical disc may be a read-only optical disc, and may be specifically a compact disk-audio (CD), a video CD, a compact disc read-only memory (CD-ROM), an audio digital versatile disc (DVD), a video compact disc (VCD), a DVD-ROM, and the like. Alternatively, the optical disc may be an erasable optical disc, and may be specifically a compact disk-recordable (CD-R), a compact disk-rewritable (CD-RW), a DVD-R, a DVD+R, a DVD+RW, a DVD-random access memory (DVD-RAM), and the like.

The optical disc may use optical information as a storage medium to store multimedia digital information such as various text, sound, graphics, images, and animations. In actual application, the optical disc may be burnt by using laser light, to form a roughness form with pits and lands on the optical disc, so as to record information.

The pits and lands on the optical disc do not directly represent 0 and 1. Reading of the optical disc is to distinguish, based on strength of reflected laser light, whether a corresponding information symbol is logic 1 or logic 0, but the strength of the reflected laser light does not directly represent 1 or 0. A sudden change point of the strength of the reflected power, in other words, a reversal point of a level generated based on the reflected laser light, is determined as logic 1. Long-time pits and lands are logic 0.

Therefore, if there are consecutive 1s, the pits and lands need to undergo a sudden change for a plurality of times, which occupies more burning space. As a result, an effective data volume is affected, and an amount of effective information recorded in the optical disc is reduced. However, if a value of the level is used to represent 1 and 0, if consecutive 0s or 1s are long, it is hard to determine how many 0s or 1s are specifically included in the consecutive 0s or 1s, and it is also hard to distinguish a conversion between 0 and 1. Therefore, a specific rule needs to be used to limit a length of the consecutive 0s or 1s.

For example, binary data may be encoded by using a run length limited (RLL) encoding rule, so that an encoded information sequence does not include consecutive 1s, and a length of consecutive 0s is also limited within a specified range.

For example, eight-to-fourteen modulation (EFM) is an RLL encoding rule. By using the EFM, original binary data may be orchestrated into a form in which there are no consecutive 1s, and a quantity of consecutive 0s is limited to be from 2 to 10 (including 2 and 10). Therefore, the binary data may be represented as RLL (2, 10). In this way, an information sequence can be identified more accurately based on a reflected signal in cooperation with clock timing information. It should be noted that 8-bit data may be encoded into 14-bit data by using the EFM. After the 8-bit data is encoded into the 14-bit data, two pieces of 14-bit data also need to meet a requirement of the RLL (2, 10). Therefore, a 3-bit merging bit needs to be added based on a status of adjacent 14-bit data, so that a final encoding length corresponding to the 8-bit data is 17 bits. It can be learned that the 3-bit merging bit is added to ensure that two pieces of 14-bit encoded data still meet the requirement of the RLL (2, 10). Therefore, the EFM may be considered as an 8:17 encoding mode.

In RLL encoding, a time length, that is, a run length, between two adjacent jumps may be described by using (d, k). d and k respectively represent a minimum length and a maximum length of consecutive "0" elements between a pair of "1" elements. After original data is encoded based on the RLL, the optical disc may be burnt based on encoded data, to record information by using pits and lands after burning.

Figure 1:
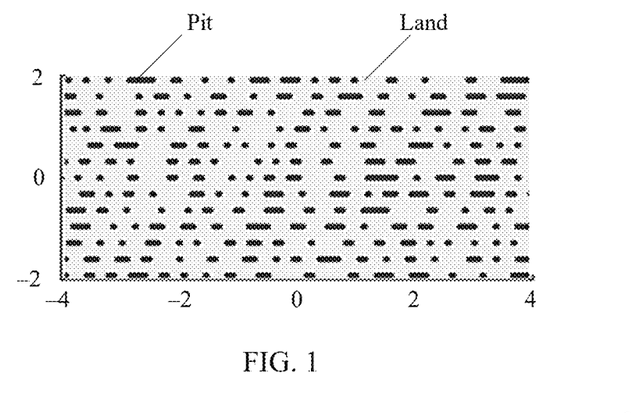
FIG. 1 is an example diagram of pits and lands distribution status of an optical disc according to an embodiment of this application.

Based on the RLL encoding, after the optical disc is burnt, an example of pits and lands distribution of the optical disc is shown in FIG. 1.

In the example shown in FIG. 1, lengths of pits and lands are generally different. Therefore, when data is read from the optical disc, extremely high time sequence stability (for example, synchronization and stability of a clock signal, and stability of laser light and optical disc control) needs to be ensured. During an optical disc signal detection and reading process, any time sequence instability or jitter may cause a deviation in time sequence length information of continuous "0" bits, resulting in a bit error.

Currently, a conventional optical disc reading process is based on different reflectivity of pits and lands in the optical disc to incident laser light, so that reflected light corresponding to the pits and the lands is different, and data is read.

In view of this, the information verification method in embodiments of this application may be applied to a fluorescent optical storage system, so that a plurality of discretely arranged fluorescent spots may be generated on an optical disc by using the fluorescent optical storage system, and information is stored by using the plurality of fluorescent spots.

2. In another example, embodiments of this application may be applied to a scenario of identifying a defect on an object surface.

For example, a plurality of fluorescent spots arranged in an array may be disposed on a surface of a to-be-detected object in advance, and then the surface of the to-be-detected object may be irradiated by a light emitting device such as a laser, and a fluorescent signal obtained based on the fluorescent spots is obtained by using a device such as a photoelectric detector, to determine positions of the fluorescent spots based on a status of the fluorescent signal, for example, detect whether a defect exists at the positions of the fluorescent spots.

The following describes a specific implementation process of an information verification method in an embodiment of this application.

Figure 2:
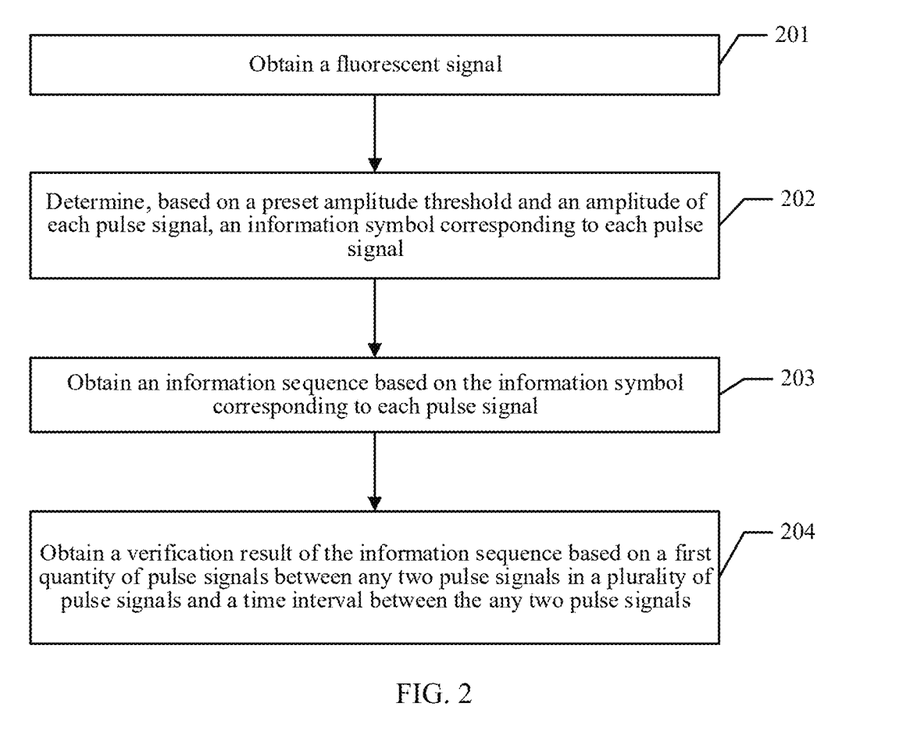
FIG. 2 is an example diagram of an information verification method according to an embodiment of this application.

As shown in FIG. 2, the information verification method in this embodiment of this application includes step 201 to step 204.

Step 201: Obtain a fluorescent signal.

The fluorescent signal is an electrical signal generated based on a plurality of fluorescent spots, and the fluorescent signal includes a plurality of pulse signals.

In this embodiment of this application, the fluorescent spot may be a spot formed by using a fluorescent material. Fluorescent light means that after being excited by light of a specific wavelength, the fluorescent material emits light whose wavelength is greater than the excitation wavelength in extremely short time (for example, $10^{\wedge}-8$ seconds). A type of the fluorescent material is not limited herein, and a form such as a size, a thickness, a color, and a shape of the fluorescent spot may also be determined based on an actual application scenario, and is not limited herein either.

The fluorescent spot may be excited by light such as laser light to produce fluorescent light or scattered light. Then, an electrical signal may be generated by detecting, by using a device such as a photoelectric detector, an optical signal generated by the fluorescent spot. The electrical signal may be used as the fluorescent signal in this embodiment of this application.

In this embodiment of this application, the fluorescent signal may include the plurality of pulse signals. In some examples, the plurality of fluorescent spots may be arranged discretely. In this case, a laser sequentially passes through the plurality of fluorescent spots according to a preset moving rule, and generates, when passing through each fluorescent spot, a pulse signal based on fluorescent light and/or scattered light emitted by the fluorescent spot, to obtain the fluorescent signal including the plurality of pulse signals.

In this embodiment of this application, the plurality of fluorescent spots may include at least two fluorescent spots of a same form, or may include at least two fluorescent spots of different forms. If forms of any two fluorescent spots are different, parameters such as amplitudes of correspondingly generated pulse signals may be different.

For example, in some examples, the plurality of fluorescent spots may include at least two fluorescent spots of different sizes. If sizes of two fluorescent spots are different, when same laser light is separately irradiated on the two fluorescent spots, light intensity of fluorescent light excited by the two fluorescent spots is also different. Correspondingly, amplitudes of pulse signals respectively generated based on the fluorescent light excited by the two fluorescent spots may also be different.

It should be noted that, in this embodiment of this application, there may be a plurality of application manners for a specific length and a determining manner of the fluorescent signal.

For example, signals about the fluorescent spot that are detected in preset duration may be used as a group of fluorescent signals, or signals between any two adjacent pulse signals whose maximum pulse amplitude is greater than a specified threshold may be used as a group of fluorescent signals.

In this embodiment of this application, in different application scenarios, the fluorescent spot may be located on different objects.

For example, in an example, the fluorescent spot may be used in a fluorescent optical storage scenario. At a data writing stage, fluorescent spots may be generated on an optical disc, and fluorescent spots of different sizes or fluorescent spots of different colors may correspond to different information symbols. At a data reading stage, the laser may be moved according to a moving rule during writing, and in a moving process, the laser irradiates the optical disc by using laser light, and the photoelectric detector detects fluorescent light or scattered light of the fluorescent spot that is excited by using the laser light, to obtain read information based on information such as intensity and/or a color of the detected fluorescent light or scattered light.

In this case, in fluorescent optical storage, the fluorescent spots on a memory such as the optical disc may be discrete. Therefore, an encoding mode such as RLL may not be used for encoding.

It can be learned that, in some scenarios, when information is stored in a fluorescent optical storage manner, one of the discrete fluorescent spots may be used to correspond to one or more information symbols in an information sequence. In comparison with an existing optical disc based on RLL encoding for storage, fluorescent spots on an optical disc implemented based on the fluorescent optical storage are in a discrete form, so that there is no long pit used to describe consecutive logic 0s. Therefore, an information length does not need to be determined from an electrical signal corresponding to a long pit, so that a bit error easily caused due to time sequence instability when data is read from the optical disc burnt based on the RLL encoding mode is avoided.

In another example, the fluorescent spot may be used in a scenario of identifying a defect on an object surface. For example, a plurality of fluorescent spots arranged in an array may be disposed on a surface of a to-be-detected object in advance. Then, the laser may irradiate the surface of the to-be-detected object according to a preset moving rule, and after the fluorescent spots are irradiated, a device such as a photoelectric detector detects an optical signal generated based on the fluorescent spots to obtain a corresponding fluorescent signal.

Step 202: Determine, based on a preset amplitude threshold and an amplitude of each pulse signal, an information symbol corresponding to each pulse signal.

A unit of the preset amplitude threshold may be determined based on an actual scenario.

For example, in an example, if the amplitude of each pulse signal includes a maximum amplitude of a voltage value of the pulse signal, the unit of the preset amplitude threshold may be a voltage.

In addition, a quantity of preset amplitude thresholds is not limited herein either. For example, there may be a plurality of preset amplitude thresholds. Each preset amplitude threshold may correspond to one information symbol, or a range between two adjacent preset thresholds may correspond to one information symbol. Each information symbol may be one information symbol, or may include a plurality of information symbols. A correspondence between the preset amplitude threshold and the information symbol may be determined based on an actual application scenario requirement. This is not limited herein.

A specific form and a meaning of the information symbol are not limited herein either. For example, the information symbol may include "0", "1", "00", "11", or the like, or may include another number and/or symbol form.

Order-2 encoding is used as an example for description.

In an order-2 encoding scenario, there are two types of information symbols corresponding to a pulse. For example, the types of the information symbols include 0 and 1. Preset amplitude thresholds $V\_0$ and $V\_1$ may be preset, and $V\_0 < V\_1$. For any pulse signal, a maximum amplitude of a voltage value of the pulse signal is $V\_t$. If $V\_t$ is not less than $V\_0$ but less than $V\_1$, it is determined that an information symbol corresponding to the pulse signal is 0. If $V\_t$ is greater than $V\_1$, it is determined that an information symbol corresponding to the pulse signal is 1.

Order-3 encoding is used as an example for description.

In an order-3 encoding scenario, there are three types of information symbols corresponding to a pulse.

For example, the types of the information symbols include 0, 1, and 2. The information symbol 0 and the information symbol 1 may be considered as basic information symbols, and the information symbol 2 may be considered as a high-order information symbol.

In this scenario, storage capacities corresponding to information of 0 and information of 1 may be used as a basic capacity of a memory, and a storage capacity corresponding to information of the information symbol 2 may be used as an extended capacity of the memory.

In an example, sizes of fluorescent spots respectively corresponding to the information symbol 2, the information symbol 1, and the information symbol 0 may reduce sequentially. Distances between center points of the fluorescent spots respectively corresponding to the information symbol 2, the information symbol 1, and the information symbol 0 and center points of respective adjacent fluorescent spots of the fluorescent spots may be equal or different.

A storage capacity of the optical disc may generally be increased by using multi-order encoding. For example, a storage capacity $C\_1$ of the optical disc using multi-order encoding is: $C\_1 = \log\_2(n*C)$. n is an order number, and C is a storage capacity of the optical disc using the order-2 encoding. It can be learned that a storage capacity of an optical disc using the order-3 encoding is approximately 1.585 times that of the optical disc using the order-2 encoding, and a storage capacity of an optical disc using order-4 encoding is approximately twice that of the optical disc using the order-2 encoding.

Certainly, information corresponding to each information symbol may alternatively be other information, and an arrangement manner of fluorescent spots corresponding to each information symbol may alternatively be another manner. This is merely an example for description, but not a limitation herein.

In addition, the type of the information symbol may be another type, and corresponding encoding may alternatively be other multi-order encoding. This is not limited herein. For another multi-order encoding scenario, refer to the foregoing order-2 encoding scenario and order-3 encoding scenario. Details are not described herein again.

Step 203: Obtain an information sequence based on the information symbol corresponding to each pulse signal.

In this embodiment of this application, the information sequence may be obtained based on the information symbol corresponding to each pulse signal and a time sequence relationship between pulse signals. A time sequence of an information symbol in the information sequence corresponds to a time sequence of a corresponding pulse signal.

Figure 3:
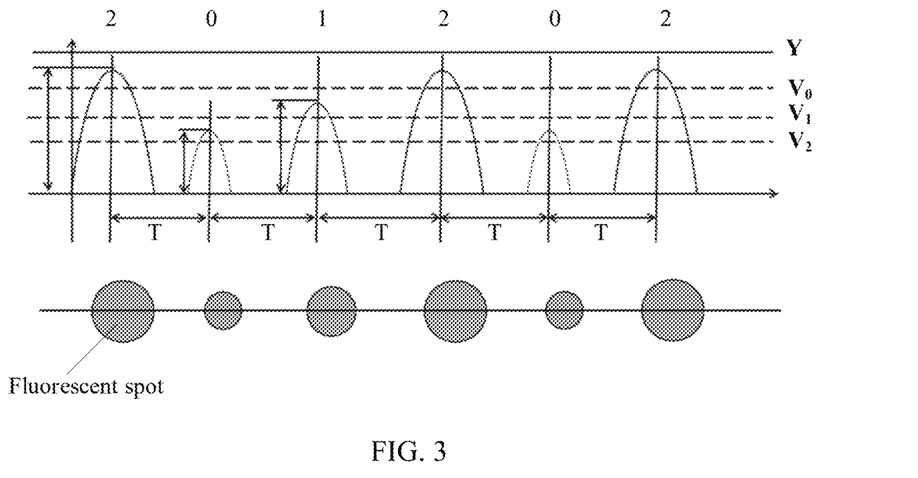
FIG. 3 is an example diagram of a fluorescent signal and an information sequence according to an embodiment of this application.

For example, FIG. 3 is an example diagram of a fluorescent signal and an information sequence.

The fluorescent signal is generated based on six sequentially arranged fluorescent spots, and the fluorescent signal generated based on the fluorescent spots includes six pulse signals. Based on maximum amplitudes of the six pulse signals and preset $V\_0$, $V\_1$, and $V\_2$, it may be determined that information symbols corresponding to the six pulse signals are sequentially 2, 0, 1, 2, 0, and 2, so that an information sequence 201202 is obtained.

Step 204: Obtain a verification result of the information sequence based on a first quantity of pulse signals between any two pulse signals in the plurality of pulse signals and a time interval between the any two pulse signals.

In this embodiment of this application, the pulse signal may be counted by a pulse counter, to detect a quantity of pulse signals in the fluorescent signal.

After the quantity of pulse signals in the fluorescent signal is obtained, it may be verified, based on the time interval between the any two pulse signals in the fluorescent signal and the first quantity of pulse signals included between the two pulse signals, whether there is pulse missing detection, to obtain the verification result of the information sequence.

The any two pulse signals may be determined in a plurality of manners.

For example, in the fluorescent signal, two closest pulse signals corresponding to an information symbol "1" may be used as the any two pulse signals. In addition, for example, for every two closest pulse signals corresponding to the information symbol "1" in the fluorescent signal, verification may be performed based on a first quantity of pulse signals between the two closest pulse signals and a time interval between the two closest pulse signals. Alternatively, a first pulse signal and a last pulse signal in the fluorescent signal may be used as the any two pulse signals. Alternatively, two pulse signals may be randomly selected from the fluorescent signal as the any two pulse signals.

During a verification process, an expected quantity of pulse signals included in the time interval between the any two pulse signals may be calculated. If the expected quantity is consistent with the first quantity of pulse signals included between the two pulse signals, it may be determined that there is no pulse missing detection between the two corresponding pulse signals.

Alternatively, a product of the first quantity and a preset period threshold may be calculated. If the product matches the time interval between the two corresponding pulse signals, it is determined that there is no pulse missing detection between the two corresponding pulse signals.

Figure 4:
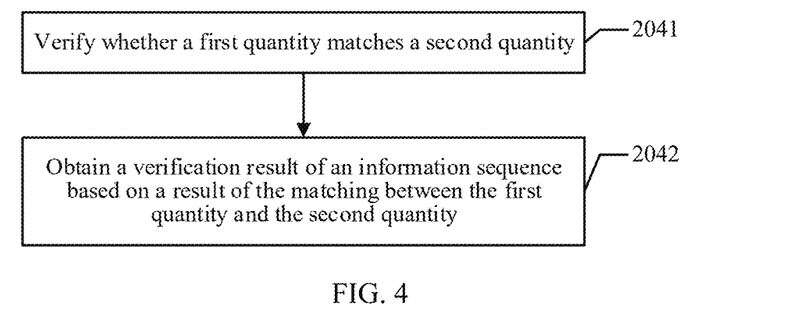
FIG. 4 is an example diagram of step 204 according to an embodiment of this application.

As shown in FIG. 4, in some embodiments, step 204 includes:

Step 2041: Verify whether the first quantity matches a second quantity.

The second quantity is determined based on the preset period threshold and the time interval between the any two pulse signals.

Step 2042: Obtain the verification result of the information sequence based on a result of the matching between the first quantity and the second quantity.

The verification result indicates whether a quantity of bits of the information sequence is correct.

For example, the preset period threshold may be related to information such as a moving speed of a photoelectric detector that reads a fluorescent signal, and an interval between fluorescent spots.

For example, if the moving speed of the photoelectric detector is v, and the interval between center points of the fluorescent spots is fixed to k, the preset period threshold may be k/v, in other words, duration required for the photoelectric detector to move from a center point of a fluorescent spot to a center point of a next fluorescent spot.

A quantity of information symbols in the information sequence corresponds to a quantity of pulse signals corresponding to the information sequence. The second quantity reflects the expected quantity of pulse signals included in the time interval between the any two pulse signals. Therefore, if the first quantity matches the second quantity, it may be considered that the quantity of detected pulse signals in the fluorescent signal is correct, and it may be considered that the quantity of bits of the information sequence corresponding to the fluorescent signal is correct.

There may be a plurality of manners for verifying whether the first quantity matches the second quantity.

In an example, verifying whether the first quantity matches the second quantity may include the following steps:
  obtaining the second quantity based on the preset period threshold and the time interval between the any two pulse signals; and
  verifying whether the first quantity matches the second quantity.

In this example, a specific value of the second quantity may be calculated, and whether the first quantity matches the second quantity is verified by directly comparing the first quantity with the second quantity.

In another example, verifying whether the first quantity matches the second quantity may include the following steps:
  calculating the product of the first quantity and the preset period threshold; and
  verifying whether the product matches the time interval between the any two pulse signals to verify whether the first quantity matches the second quantity.

In this example, a specific value of the second quantity is not directly calculated, and whether the first quantity matches the second quantity is verified by verifying whether the product of the first quantity and the preset period threshold matches the corresponding time interval. If the product matches the corresponding time interval, it may be indicated that the first quantity matches the second quantity.

Generally, that the first quantity matches the second quantity may be that the first quantity is the same as the second quantity. However, in some other examples, that the first quantity matches the second quantity may alternatively be that a difference between the first quantity and the second quantity is a preset value, a ratio of the first quantity to the second quantity is a preset ratio, or the like. This is not limited in embodiments of this application.

An example is used for description below.

Figure 5:
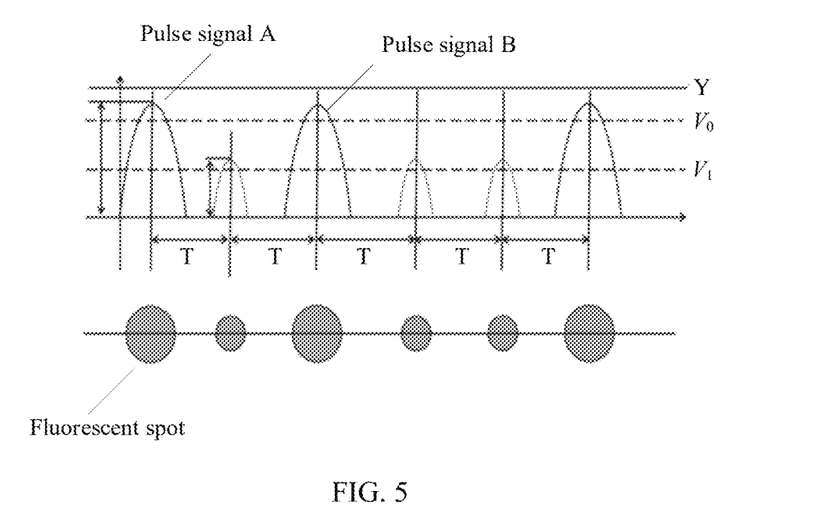
FIG. 5 is an example diagram of a fluorescent signal and fluorescent spots according to an embodiment of this application.

In an example, in an example diagram of a fluorescent signal and fluorescent spots shown in FIG. 5, if the fluorescent signal includes a pulse signal A and a pulse signal B, and maximum amplitudes of the pulse signal A and the pulse signal B are both greater than V0, it may be considered that the pulse signal A and the pulse signal B are two closest pulse signals corresponding to the information symbol "1".

By pulse counting, it may be detected that in the example shown in FIG. 5, a first quantity n of pulse signals included between the pulse signal A and the pulse signal B and corresponding to the information symbol "0" is 1, and a second quantity t of preset period thresholds T between the pulse signal A and the pulse signal B may be calculated to be 2, which satisfies a relationship of n+1=t. Therefore, it may be considered that a quantity of pulse signals included between the pulse signal A and the pulse signal B matches a corresponding time interval.

In this way, mutual verification may be performed based on a quantity of pulse signals and a time interval between pulse signals, to efficiently verify whether there is a bit error such as pulse missing detection in a scenario such as optical disc information reading. In addition, because each pulse signal corresponds to an information symbol, different from a current conventional optical disc information reading process, there is no need to strictly ensure synchronization of a clock signal during data reading and writing, and a high bit error rate caused by data jitter in the conventional optical disc information reading process can be avoided.

It should be noted that, in different application scenarios, specific content and functions of the verification result of the information sequence may be different. Examples are described below.

In some examples, the method may be applied to a control device in a surface defect detection system. The surface defect detection system is configured to identify a defect on an object surface, and correspondingly, a surface of a to-be-detected object includes a plurality of fluorescent spots arranged according to a specified rule.

The fluorescent signal is generated based on the plurality of fluorescent spots on the surface.

For example, a plurality of fluorescent spots arranged in an array may be disposed on the surface of the to-be-detected object in advance. Then, a laser may irradiate the surface of the to-be-detected object according to a preset moving rule, and after the fluorescent spots are irradiated, a device such as a photoelectric detector detects an optical signal generated based on the fluorescent spots to obtain a corresponding fluorescent signal.

If a difference between an amplitude of a pulse signal in the fluorescent signal and a preset amplitude threshold is large, it may be considered that there may be a defect at a position in which a fluorescent spot corresponding to the pulse signal is located. In addition, whether a position of each fluorescent spot is accurately detected may be verified based on a first quantity of pulse signals between any two pulse signals in the fluorescent signal and a time interval between the any two pulse signals. If the first quantity matches the time interval, it may be considered that a quantity of bits of an information sequence corresponding to the fluorescent signal is correct, and it indicates that the information sequence can accurately describe a position of a fluorescent spot associated with the fluorescent signal. For example, if the information sequence is "0100", there is a defect at a position of a fluorescent spot corresponding to a second information symbol "1".

In some other examples, the method is applied to a control device in a fluorescent optical storage system. The fluorescent optical storage system further includes an optical disc, and the optical disc includes a plurality of fluorescent spots arranged according to a specified rule. A fluorescent signal is generated based on the plurality of fluorescent spots on the optical disc.

In this example, the fluorescent spot on the optical disc is used to implement fluorescent optical storage.

In this case, if a first quantity of pulse signals between any two pulse signals in a plurality of pulse signals matches a time interval between the any two pulse signals, it may be considered that a quantity of bits of an information sequence is correct. However, if a first quantity of pulse signals between any two pulse signals in a plurality of pulse signals does not match a time interval between the any two pulse signals, there may be missing detection between the any two pulse signals, and consequently, there may be a bit error in an information sequence. In this case, there may be a plurality of manners for processing the information sequence. For example, a sequence part corresponding to the any two pulse signals may be discarded, or a corresponding sequence part may be re-detected.

When information is stored in a fluorescent optical storage manner, one of discrete fluorescent spots may be used to correspond to one or more information symbols in the information sequence. In comparison with an existing optical disc based on RLL encoding for storage, fluorescent spots on an optical disc implemented based on the fluorescent optical storage are in a discrete form, so that there is no long pit used to describe consecutive logic 0s. Therefore, an information length does not need to be determined from an electrical signal corresponding to a long pit, so that a bit error easily caused due to time sequence instability when data is read from the optical disc burnt based on the RLL encoding mode is avoided.

It can be learned from the foregoing plurality of examples that, in this embodiment of this application, the information sequence corresponding to the plurality of fluorescent spots may be obtained based on amplitudes of the plurality of pulse signals included in the fluorescent signal and the preset amplitude threshold, and then mutual verification may be performed based on a quantity of pulse signals in the fluorescent signal and a time interval between pulse signals, to efficiently verify whether there is a bit error such as pulse missing detection. In this way, whether the read information sequence is accurate can be efficiently verified in a scenario such as fluorescent optical storage, and whether a surface defect is detected can be further verified in a scenario such as surface defect detection.

In addition, in a fluorescent optical storage scenario, in comparison with a current equalizer that is in a conventional high-rate optical disc and that has a complex setting manner and a strict requirement on system resources, a setting manner of an equalizer for adjusting a fluorescent signal including a plurality of pulse signals is simpler, and generally, there is no need to consume a large quantity of system resources.

In this embodiment of this application, the laser may belong to the fluorescent optical storage system. A specific structure of the fluorescent optical storage system is not limited herein.

In some examples, the fluorescent optical storage system is a read and write integrated system, to be specific, the fluorescent optical storage system may be used to write data and read data.

It can be learned that, fluorescent spots may be generated on the optical disc by using the fluorescent optical storage system, to store information by using the fluorescent spots arranged according to a specified rule.

A specific structure of the fluorescent optical storage system is not limited herein.

Figure 6:
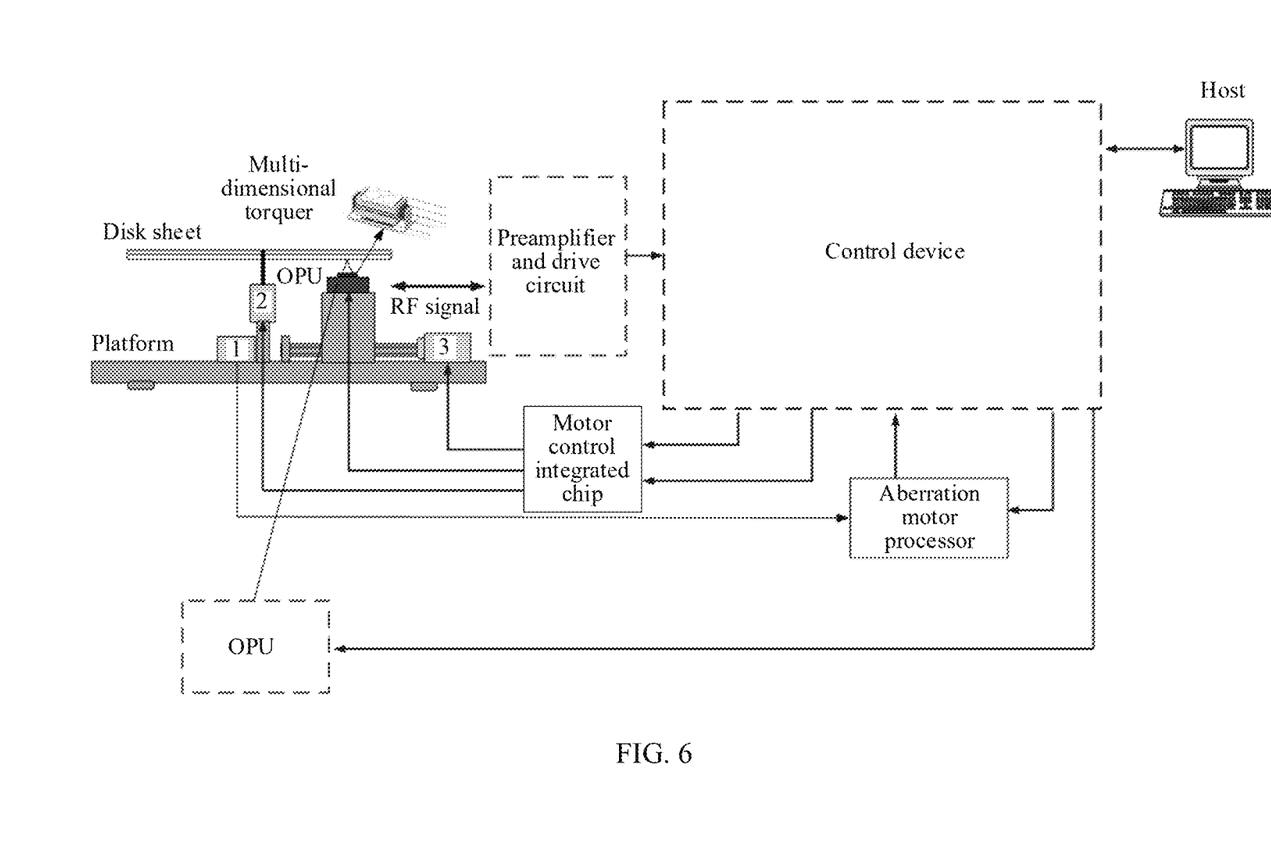
FIG. 6 is an example diagram of a structure of a fluorescent optical storage system according to an embodiment of this application.

For example, FIG. 6 is an example diagram of a structure of the fluorescent optical storage system.

In the example shown in FIG. 6, the fluorescent optical storage system may use fluorescent light to write data into a storage medium (a disk sheet), and may read data from the disk sheet.

The disk sheet may be placed on a support structure of a platform. The platform further includes an optical pick-up unit (OPU), a multi-dimensional torquer, and another component.

The OPU may specifically include a suspension line, a photo detector integrated circuit (PDIC), a power meter (PD), a laser diode (LD), an LD driver, and/or an ARM (advanced reduced instruction set computer (RISC) machines).

The fluorescent optical storage system may control a motor related to the platform and the disk sheet, and detect data during data writing and data reading processes.

Specifically, in the example shown in FIG. 6, the fluorescent optical storage system may further include a control device, an aberration motor processor, a motor control integrated chip, and a preamplifier and drive circuit. The control device may implement the information verification method in any one of the foregoing embodiments, and the control device may be connected to a host to exchange information.

The preamplifier and drive circuit may be configured to process an RF signal from a component such as the OPU, and feed back the RF signal to the control device. The motor control integrated chip may control the OPU, a motor 2, a motor 3, and the like based on an indication signal sent by the control device. The aberration motor processor may perform a processing operation related to aberration correction by using the motor 1 in the platform. For example, the aberration motor processor may include a serial port of a motor control unit (MCU) related to an aberration motor, an ARM, and the like.

For example, the control device may include an analog-to-digital converter (ADC), an ARM, and/or a field programmable gate array (FPGA), and the like, to implement a data processing task such as error signal processing and digital signal processing (DSP) such as servo control.

Certainly, the fluorescent optical storage system may alternatively be in another form. FIG. 6 is merely an example diagram of the fluorescent optical storage system, and is not a limitation. For example, the fluorescent optical storage system may include fewer or more components in FIG. 6, or may include a component different from the components in FIG. 6.

The following describes some embodiments of a process of generating a fluorescent spot and information reading.

In some embodiments, step 201 includes:
controlling a laser to move in a preset moving manner, and controlling the laser to emit first laser light to the optical disc in a moving process, so that when the laser light is irradiated to a corresponding fluorescent spot on the optical disc, the fluorescent spot emits fluorescent light; and
obtaining, via a photoelectric detector, the fluorescent signal based on the fluorescent light emitted by the fluorescent spot.

The moving manner of the laser may be determined based on an actual scenario.

A process of reading data from the optical disc is used as an example, and the laser may move around a center of the optical disc at a preset linear speed. The photoelectric detector may be configured to detect fluorescent light and/or scattered light generated by irradiating, to the fluorescent spot, the first laser light emitted by the laser. Therefore, in an electrical signal generated by the photoelectric detector based on the detected fluorescent light and/or scattered light, a time interval between pulses may be consistent with a time interval at which corresponding fluorescent spots are irradiated.

In some embodiments, the fluorescent spot is generated based on second laser light. An optical path corresponding to the second laser light passes through an electro-optic crystal. A state of each fluorescent spot is related to a magnitude of a voltage applied by an electro-optic modulator to the electro-optic crystal.

In a process of generating the fluorescent spot, the fluorescent spot is generated based on the second laser light, and an attribute such as intensity and a phase of the second laser light is modulated based on a voltage applied by an electro-optic modulator on the electro-optic crystal, so that modulated second laser light can generate a fluorescent spot in a specified state on the optical disc. It can be learned that the state of the fluorescent spot is related to the magnitude of the voltage applied by the electro-optic modulator to the electro-optic crystal. For example, the state of the fluorescent spot may include one or more of a size of the fluorescent spot, density, a thickness, a color, and the like of a fluorescent material of the fluorescent spot.

The fluorescent spot may be obtained by irradiating the second laser light on a specified material, or may be obtained by adding a fluorescent material to a fluorescent spot region after the second laser light is irradiated to the specified material to form the fluorescent spot region. A specific manner for generating the fluorescent spot is not specifically limited in embodiments of this application.

The electro-optic modulator (EOM) is a modulator prepared by using an electro-optic effect of electro-optic crystals such as a lithium niobate crystal (LiNb03), a gallium arsenide crystal (GaAs), and a lithium tantalate crystal (LiTa03). The electro-optic effect means that when a voltage is applied to an electro-optic crystal, a refractive index of the electro-optic crystal changes, and an optical wave feature of the crystal changes. Therefore, modulation of a phase, an amplitude, intensity, and/or a polarization state of an optical signal is implemented. A fluorescent optical storage scenario is used as an example.

In the scenario, a state such as a size of the fluorescent spot generated on the optical disc may be adjusted by adjusting a feature such as intensity and a polarization direction of laser light by using the EOM, so that pulse signals with different amplitudes are generated based on fluorescent spots in different states in a subsequent data reading process.

Figure 7:
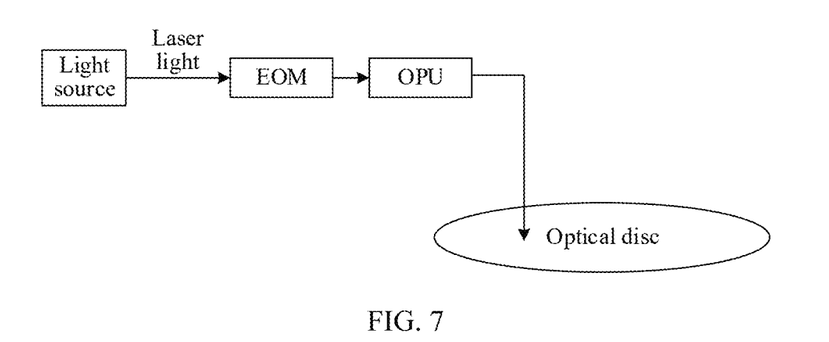
FIG. 7 is an example diagram of controlling information writing in an optical disc by an electro-optic modulator according to an embodiment of this application.

FIG. 7 is an example diagram of controlling information writing in an optical disc by using an EOM.

Laser light emitted by a light source such as an LD may be irradiated on the optical disc through the EOM and an OPU. By controlling the EOM, a feature such as intensity and a polarization direction of the laser light passing through can be adjusted, to change a state of the laser light irradiated on the optical disc.

In some embodiments, the EOM controls an arrangement manner for a plurality of generated fluorescent spots based on a voltage applied to the optical crystal with a preset period threshold.

In this case, the arrangement manner for the plurality of fluorescent spots may be an expected arrangement manner. If a moving speed of the first laser light on the optical disc in a subsequent data reading process may be consistent with a moving speed of the second laser light on the optical disc in a data writing process, in the fluorescent signal obtained via the photoelectric detector, a period between pulse signals may be consistent with the preset period threshold, so that the verification result of the information sequence can be obtained based on the preset period threshold, the first quantity of pulse signals between the any two pulse signals in the plurality of pulse signals, and the time interval between the any two pulse signals.

In some applications, applying a voltage to an electro-optic crystal may change a refractive index of a birefringent crystal in the electro-optic crystal. When laser light passes through the electro-optic crystal, a polarization direction of the laser light may be controlled by controlling intensity of the voltage applied to the electro-optic crystal. A voltage corresponding to light whose polarization direction is rotated by 90 degrees while passing through the electro-optic crystal is referred to as a half-wave voltage.

Currently, the half-wave voltage of the electro-optic crystal is usually high, and generally may reach hundreds of volts or even thousands of volts. When a control frequency of applying a voltage to the electro-optic crystal is high, for example, reaches 1 MHz or even more than 10 MHz, it is hard to implement a corresponding high-voltage and high-frequency switch. In addition, a high frequency and high voltage applied to the electro-optic crystal easily causes resonance of the electro-optic crystal, and finally causes a problem such as cracking of the electro-optic crystal.

In view of this, in an embodiment of this application, corresponding half-wave voltage may be reduced to resolve the foregoing problem.

Specifically, in some embodiments, on the optical path corresponding to the second laser light, a quarter wave plate is further disposed before the electro-optic modulator, so that the second laser light is converted from a form of linearly polarized light to a form of circularly polarized light or elliptically polarized light by using the quarter wave plate, and is incident to the electro-optic crystal in the form of circularly polarized light or elliptically polarized light.

The quarter wave plate (QWP) is also referred to as a "quarter retardation plate" and a "¼ wave plate". When light of a specific wavelength is vertically incident through the quarter wave plate, a phase difference between emergent normal light and abnormal light is ¼ wavelength.

In this embodiment of this application, before the second laser light is incident to the electro-optic crystal, a polarization state of the second laser light is adjusted in advance by using the quarter wave plate. In this way, intensity of half-wave voltage when the second laser light passes through the electro-optic crystal can be reduced, and a voltage change amplitude in a control process of the electro-optic modulator can be reduced. Because the voltage change amplitude is significantly reduced, pressure of a high voltage on a device is reduced. Therefore, a maximum modulation frequency that can be used by the electro-optic modulator in a modulation process may be generally increased, so that an information writing speed is improved.

In some examples, on the optical path corresponding to the second laser light, a polarizer may be further included after the electro-optic modulator, to control the polarization direction of the laser light by using the polarizer, so as to adjust intensity of emergent second laser light.

Figure 8:
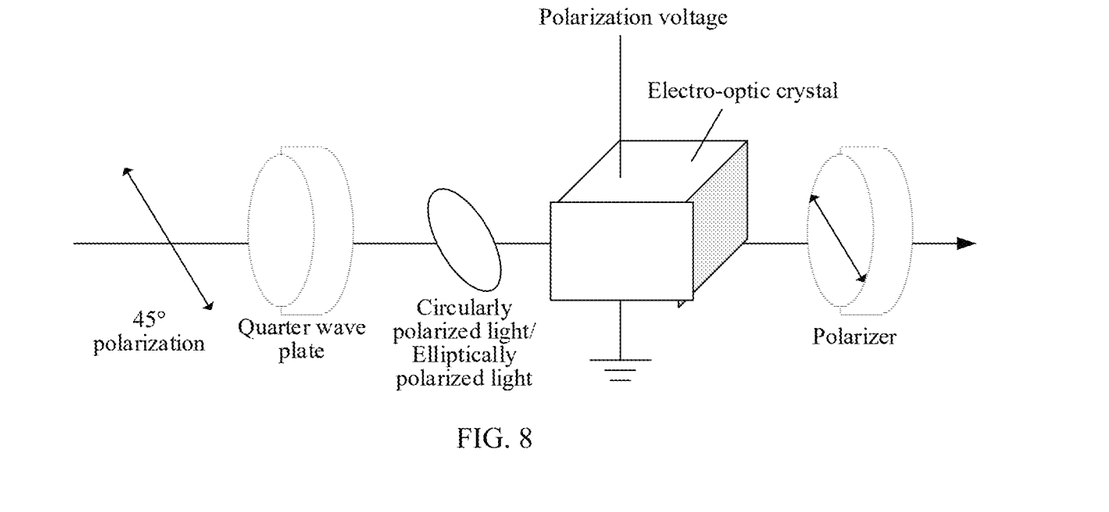
FIG. 8 is an example diagram of an optical path structure according to an embodiment of this application.

FIG. 8 is an example diagram of an optical path structure.

In an example shown in FIG. 8, an optical path of second laser light successively includes a quarter wave plate, an electro-optic crystal, and a polarizer. Polarization voltage is applied to the electro-optic crystal.

Figure 9:
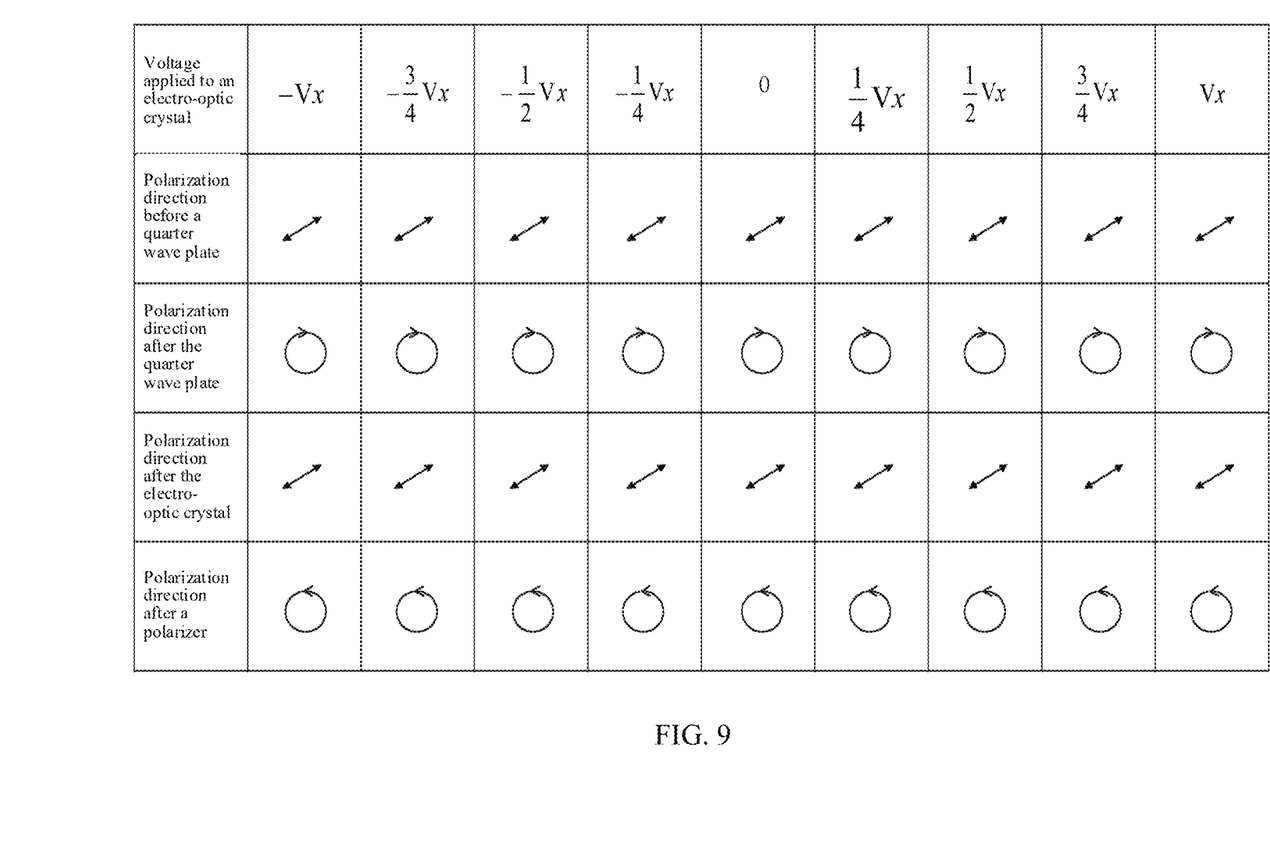
FIG. 9 is an example table diagram of a change status of a polarization direction of light on an optical path according to an embodiment of this application.

FIG. 9 is an example table diagram of a change status of a polarization direction of light corresponding to the optical path structure in FIG. 8.

The second laser light polarized along a 45° direction is incident to the quarter wave plate, then circularly polarized light or elliptically polarized light is emitted from the quarter wave plate, and the circularly polarized light or the elliptically polarized light is incident to the electro-optic crystal again. A polarization direction of light emitted from the electro-optic crystal is a polarization direction after combination. The light emitted from the electro-optic crystal may pass through the polarizer, so that the polarization direction of the light emitted from the electro-optic crystal is adjusted by using the polarizer, to adjust laser light intensity of the second laser light that passes through the polarizer.

Certainly, after the second laser light is emitted from the polarizer, the second laser light may further pass through another optical device (for example, a reflector or a lens) and then arrive at an optical disc. A type and a layout manner of the another device on the optical path are not limited in this embodiment of this application.

The foregoing describes the information verification method provided in embodiments of this application from a plurality of aspects. The following describes an information verification apparatus provided in embodiments of this application with reference to the accompanying drawings.

Figure 10:
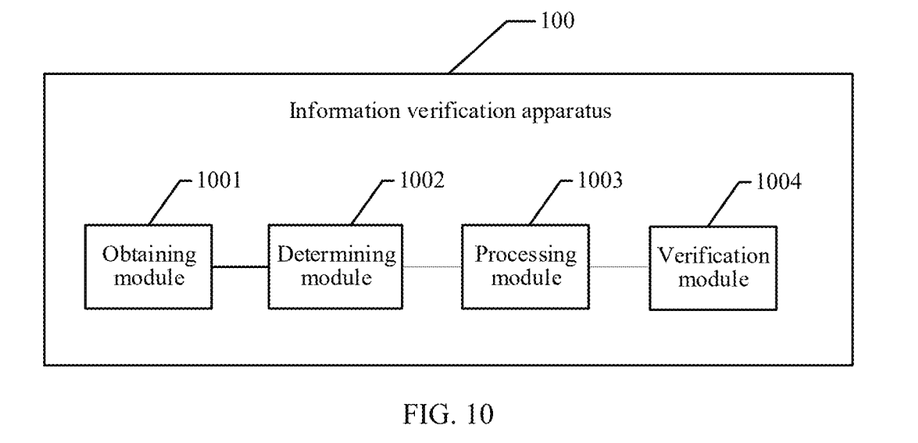
FIG. 10 is a diagram of an embodiment of an information verification apparatus according to an embodiment of this application.

As shown in FIG. 10, an embodiment of this application provides an information verification apparatus 100. The apparatus 100 may be used in the control device in the foregoing embodiment.

The information verification apparatus 100 includes:
an obtaining module 1001, configured to obtain a fluorescent signal, where the fluorescent signal is an electrical signal generated based on a plurality of fluorescent spots, and the fluorescent signal includes a plurality of pulse signals;
a determining module 1002, configured to determine, based on a preset amplitude threshold and an amplitude of each pulse signal, an information symbol corresponding to each pulse signal;
a processing module 1003, configured to obtain an information sequence based on the information symbol corresponding to each pulse signal; and
a verification module 1004, configured to obtain a verification result of the information sequence based on a first quantity of pulse signals between any two pulse signals in the plurality of pulse signals and a time interval between the any two pulse signals.

Optionally, the verification module 1004 is configured to:
verify whether the first quantity matches a second quantity, where the second quantity is determined based on a preset period threshold and the time interval between the any two pulse signals; and
obtain the verification result of the information sequence based on a result of the matching between the first quantity and the second quantity, where the verification result indicates whether a quantity of bits of the information sequence is correct.

Optionally, the apparatus is used in a control device in a fluorescent optical storage system, the fluorescent optical storage system further includes an optical disc, and the optical disc includes a plurality of fluorescent spots arranged according to a specified rule.

The fluorescent signal is generated based on the plurality of fluorescent spots on the optical disc.

Optionally, the obtaining module 1001 is configured to:
control a laser to move in a preset moving manner, and control the laser to emit first laser light to the optical disc in a moving process, so that when the first laser light is irradiated to a corresponding fluorescent spot on the optical disc, the fluorescent spot emits fluorescent light; and
obtain, via a photoelectric detector, the fluorescent signal based on the fluorescent light emitted by the fluorescent spot.

Optionally, the fluorescent spot is generated based on second laser light. An optical path corresponding to the second laser light passes through an electro-optic crystal. A state of each fluorescent spot is related to a magnitude of a voltage applied by an electro-optic modulator to the electro-optic crystal.

Optionally, on the optical path corresponding to the second laser light, a quarter wave plate is further disposed before the electro-optic modulator, so that the second laser light is converted from a form of linearly polarized light to a form of circularly polarized light or elliptically polarized light by using the quarter wave plate, and is incident to the electro-optic crystal in the form of circularly polarized light or elliptically polarized light.

Figure 11:
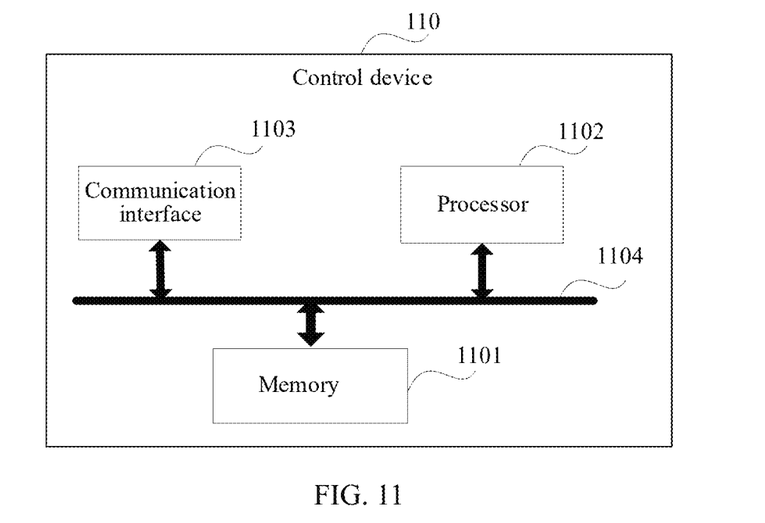
FIG. 11 is a diagram of a structure of a control device according to an embodiment of this application.

FIG. 11 is a possible diagram of a logical structure of a control device 110 according to an embodiment of this application. The control device 110 is configured to implement a function of the information verification method in any one of the foregoing embodiments. The control device 110 includes a memory 1101, a processor 1102, a communication interface 1103, and a bus 1104. The memory 1101, the processor 1102, and the communication interface 1103 are communicatively connected to each other through the bus 1104.

The memory 1101 may be a read-only memory (ROM), a static storage device, a dynamic storage device, or a random access memory (RAM). The memory 1101 may store a program. When the program stored in the memory 1101 is executed by the processor 1102, the processor 1102 and the communication interface 1103 are configured to perform one or more steps in step 201 to step 204 in the foregoing information verification method embodiments.

The processor 1102 may be a central processing unit (CPU), a microprocessor, an application-specific integrated circuit (ASIC), a graphics processing unit (GPU), a digital signal processor (DSP), a field programmable gate array (FPGA) or another programmable logic device, a discrete gate or transistor logic device, a discrete hardware component, or any combination thereof, and is configured to execute a related program to implement functions that need to be executed by the obtaining module, the determining module, the processing module, and the verification module in the information verification apparatus in the foregoing embodiment, or to perform one or more steps in step 201 to step 204 in the method embodiments of this application. The steps of the methods disclosed with reference to embodiments of this application may be performed by a hardware decoding processor, or may be performed by using a combination of hardware in the decoding processor and a software module. The software module may be stored in a storage medium that is mature in the art, such as a random access memory, a flash memory, a read-only memory, a programmable read-only memory, an electrically erasable programmable memory, or a register. The storage medium is located in the memory 1101, and the processor 1102 reads information in the memory 1101, and performs one or more steps in step 201 to step 204 in the foregoing information verification method embodiments in combination with hardware of the processor 1102.

The communication interface 1103 uses, by way of example but not limitation, a transceiver apparatus such as a transceiver to implement communication between the control device 110 and another device or communication network.

The bus 1104 may implement a path for transmitting information among components (for example, the memory 1101, the processor 1102, and the communication interface 1103) of the control device 110. The bus 1104 may be a peripheral component interconnect (PCI) bus, an extended industry standard architecture (EISA) bus, or the like. The bus may include an address bus, a data bus, a control bus, and the like. For ease of representation, only one bold line is to represent the bus in FIG. 11, but this does not mean that there is only one bus or only one type of bus.

In another embodiment of this application, a computer-readable storage medium is further provided. The computer-readable storage medium stores computer-executable instructions. When a processor of a device executes the computer-executable instructions, the device performs the steps performed by the processor in FIG. 11.

In another embodiment of this application, a computer program product is further provided. The computer program product includes computer-executable instructions, and the computer-executable instructions are stored in a computer-readable storage medium. When a processor of a device executes the computer-executable instructions, the device performs the steps performed by the processor in FIG. 11.

In another embodiment of this application, a chip system is further provided. The chip system includes a processor, and the processor is configured to implement the steps performed by the processor in FIG. 11. In a possible design, the chip system may further include a memory. The memory is configured to store program instructions and data necessary for a data writing apparatus. The chip system may include a chip, or may include a chip and another discrete component.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

A person skilled in the art can clearly understand that for convenience and conciseness of description, for specific working processes of the foregoing systems, devices, and units, reference may be made to the corresponding processes in the foregoing method embodiments, and details are not described herein again.

In the several embodiments provided in embodiments of this application, it should be understood that the disclosed system, apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located at one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of embodiments of this application essentially, or the part contributing to the conventional technology, or some of the technical solutions may be implemented in the form of a software product. The computer software product is stored in a storage medium, and includes several instructions for instructing a control device (which may be a personal computer, a server, or a network device) to perform all or some of the steps of the methods of each embodiment in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of embodiments of this application, but are not intended to limit the protection scope of embodiments of this application.

What is claimed is:

1. An information verification method, wherein the method is applied to an electronic device and comprises:
   obtaining a fluorescent signal that is an electrical signal generated based on a plurality of fluorescent spots, and the fluorescent signal comprises a plurality of pulse signals;
   determining, based on a preset amplitude threshold and an amplitude of each pulse signal, an information symbol associated with each pulse signal;
   obtaining an information sequence based on the information symbol associated with each pulse signal; and
   obtaining a verification result of the information sequence based on a first quantity of pulse signals between any two pulse signals in the plurality of pulse signals and a time interval between the any two pulse signals.

2. The method according to claim 1, wherein obtaining the verification result of the information sequence based on the first quantity of pulse signals between the any two pulse signals in the plurality of pulse signals and the time interval between the two pulse signals comprises:
   verifying whether the first quantity matches a second quantity that is determined based on a preset period threshold and the time interval between the any two pulse signals; and
   obtaining the verification result of the information sequence based on a result of the matching between the first quantity and the second quantity, wherein the verification result indicates whether a quantity of bits of the information sequence is correct.

3. The method according to claim 1, wherein the method is applied to a control device in a fluorescent optical storage system, the fluorescent optical storage system further comprises an optical disc comprising the plurality of fluorescent spots arranged according to a specified rule; and
   the fluorescent signal is generated based on the plurality of fluorescent spots on the optical disc.

4. The method according to claim 3, wherein obtaining the fluorescent signal comprises:
   controlling a laser to move in a preset moving manner, and controlling the laser to emit first laser light to the optical disc in a moving process, so that based on the first laser light being irradiated to a corresponding fluorescent spot on the optical disc, the fluorescent spot emits fluorescent light; and
   obtaining, via a photoelectric detector, the fluorescent signal based on the fluorescent light emitted by the fluorescent spot.

5. The method according to claim 3, wherein the fluorescent spot is generated based on second laser light, an optical path associated with the second laser light passes through an electro-optic crystal, and a state of each fluorescent spot is related to a magnitude of a voltage applied by an electro-optic modulator to the electro-optic crystal.

6. The method according to claim 5, wherein on the optical path associated with the second laser light, a quarter wave plate is further disposed before the electro-optic modulator, so that the second laser light is converted from a form of linearly polarized light to a form of circularly polarized light or elliptically polarized light by using the quarter wave plate, and is incident to the electro-optic crystal in the form of circularly polarized light or elliptically polarized light.

7. An information verification apparatus comprising:
   a processor; and
   a memory which is coupled to the processor and stores processor-executable instructions, wherein the processor executes the instructions causing the apparatus to:
      obtain a fluorescent signal that is an electrical signal generated based on a plurality of fluorescent spots, and the fluorescent signal comprises a plurality of pulse signals;
      determine, based on a preset amplitude threshold and an amplitude of each pulse signal, an information symbol associated with each pulse signal;
      obtain an information sequence based on the information symbol associated with corresponding to each pulse signal; and
      obtain a verification result of the information sequence based on a first quantity of pulse signals between any two pulse signals in the plurality of pulse signals and a time interval between the any two pulse signals.

8. The apparatus according to claim 7, wherein the processor is further configured to:

verify whether the first quantity matches a second quantity that is determined based on a preset period threshold and the time interval between the any two pulse signals; and obtain the verification result of the information sequence based on a result of the matching between the first quantity and the second quantity, wherein the verification result indicates whether a quantity of bits of the information sequence is correct.

9. The apparatus according to claim 7, wherein the apparatus is used in a control device in a fluorescent optical storage system, the fluorescent optical storage system further comprises an optical disc, and the optical disc comprises the plurality of fluorescent spots arranged according to a specified rule; and the fluorescent signal is generated based on the plurality of fluorescent spots on the optical disc.

10. The apparatus according to claim 9, wherein the processor is further configured to:

control a laser to move in a preset moving manner, and control the laser to emit first laser light to the optical disc in a moving process, so that based on the first laser light being irradiated to a corresponding fluorescent spot on the optical disc, the fluorescent spot emits fluorescent light; and obtain, via a photoelectric detector, the fluorescent signal based on the fluorescent light emitted by the fluorescent spot.

11. The apparatus according to claim 9, wherein the fluorescent spot is generated based on second laser light, an optical path corresponding to the second laser light passes through an electro-optic crystal, and a state of each fluorescent spot is related to a magnitude of a voltage applied by an electro-optic modulator to the electro-optic crystal.

12. The apparatus according to claim 11, wherein on the optical path corresponding to the second laser light, a quarter wave plate is further disposed before the electro-optic modulator, so that the second laser light is converted from a form of linearly polarized light to a form of circularly polarized light or elliptically polarized light by using the quarter wave plate, and is incident to the electro-optic crystal in the form of circularly polarized light or elliptically polarized light.

13. A control device comprising at least one processor, a memory, and instructions that are stored in the memory and that can be executed by the at least one processor, and the at least one processor executes the instructions to cause the control device to:

obtain a fluorescent signal that is an electrical signal generated based on a plurality of fluorescent spots, and the fluorescent signal comprises a plurality of pulse signals;

determine, based on a preset amplitude threshold and an amplitude of each pulse signal, an information symbol associated with each pulse signal;

obtain an information sequence based on the information symbol associated with each pulse signal; and obtain a verification result of the information sequence based on a first quantity of pulse signals between any two pulse signals in the plurality of pulse signals and a time interval between the any two pulse signals.

14. The control device according to claim 13, wherein the control device is further configured to:

verify whether the first quantity matches a second quantity that is determined based on a preset period threshold and the time interval between the any two pulse signals; and obtain the verification result of the information sequence based on a result of the matching between the first quantity and the second quantity, wherein the verification result indicates whether a quantity of bits of the information sequence is correct.

15. The control device according to claim 13, wherein the control device is located in a fluorescent optical storage system, the fluorescent optical storage system further comprises an optical disc, and the optical disc comprises the plurality of fluorescent spots arranged according to a specified rule; and the fluorescent signal is generated based on the plurality of fluorescent spots on the optical disc.

16. The control device according to claim 15, wherein the control device is further configured to:

control a laser to move in a preset moving manner, and control the laser to emit first laser light to the optical disc in a moving process, so that based on the first laser light being irradiated to a corresponding fluorescent spot on the optical disc, the fluorescent spot emits fluorescent light; and obtain, via a photoelectric detector, the fluorescent signal based on the fluorescent light emitted by the fluorescent spot.

17. The control device according to claim 15, wherein the fluorescent spot is generated based on second laser light, an optical path corresponding to the second laser light passes through an electro-optic crystal, and a state of each fluorescent spot is related to a magnitude of a voltage applied by an electro-optic modulator to the electro-optic crystal.

18. The control device according to claim 17, wherein on the optical path corresponding to the second laser light, a quarter wave plate is further disposed before the electro-optic modulator, so that the second laser light is converted from a form of linearly polarized light to a form of circularly polarized light or elliptically polarized light by using the quarter wave plate, and is incident to the electro-optic crystal in the form of circularly polarized light or elliptically polarized light.

* * * * *